(12) United States Patent
Pietig et al.

(10) Patent No.: US 11,490,640 B2
(45) Date of Patent: Nov. 8, 2022

(54) SUSPENDABLE FEED BLOCK SYSTEM FOR ANIMALS AND METHOD FOR MAKING SAME

(71) Applicant: Ridley USA Inc., Mankato, MN (US)

(72) Inventors: Jamie Lee Pietig, Sleepy Eye, MN (US); Chunjiang Fu, North Mankato, MN (US); Wajira Asanga Ratnayake Manamperi, Los Angeles, CA (US); Dan Dhuyvetter, North Mankato, MN (US); Luke Swalla, Mankato, MN (US)

(73) Assignee: Ridley USA Inc., Mankato, MN (US)

( * ) Notice: Subject to any disclaimer, the term of this patent is extended or adjusted under 35 U.S.C. 154(b) by 157 days.

(21) Appl. No.: 16/425,459

(22) Filed: May 29, 2019

(65) Prior Publication Data

US 2019/0364930 A1 Dec. 5, 2019

Related U.S. Application Data

(60) Provisional application No. 62/679,238, filed on Jun. 1, 2018.

(51) Int. Cl.
*A23K 50/30* (2016.01)
*A23K 20/24* (2016.01)
(Continued)

(52) U.S. Cl.
CPC .............. *A23K 50/30* (2016.05); *A23K 10/33* (2016.05); *A23K 20/24* (2016.05); *A23K 10/40* (2016.05); *A23K 20/174* (2016.05); *A23K 50/10* (2016.05)

(58) Field of Classification Search
CPC ........ A23K 50/30; A23K 50/10; A23K 20/24; A23K 10/33; A23K 20/174; A23K 10/40
(Continued)

(56) References Cited

U.S. PATENT DOCUMENTS 3,532,503 A 10/1970 Kviesitis
3,961,081 A 6/1976 McKenzie
(Continued)

FOREIGN PATENT DOCUMENTS

WO 2004062378 A1 7/2004

OTHER PUBLICATIONS

Chickens Recipe, (Jan. 2016) "Homemade DIY Flock Block For Chickens Recipe", www.thehappychickencoop.com/homemade-diy-flock-block/.=p. (Year: 2016).*
(Continued)

*Primary Examiner* — Helen F Heggestad
(74) *Attorney, Agent, or Firm* — Barnes & Thornburg LLP

(57) ABSTRACT

A suspendable feed block system for animals has a feed block formed of a hardened mass of feed supplement material in block form, wherein the feed supplement material provides a source of magnesium. The feed block is molded around and encases a feed block support. The support has an elongated flexible element including a plurality of protuberances located intermittently along a length of the element. At least one end of the elongated flexible element protrudes from the feed block and is fastenable to a separate suspending component. A method of manufacturing the suspendable feed block system for animals is also provided. A mold can be used for forming the feed block with the support suspended or encased therein, and the mold can be biodegradable, edible, or both.

21 Claims, 7 Drawing Sheets

(51) Int. Cl.
  *A23K 10/33* (2016.01)
  *A23K 20/174* (2016.01)
  *A23K 50/10* (2016.01)
  *A23K 10/40* (2016.01)

(58) Field of Classification Search
  USPC .................................. 426/74, 1, 2, 615, 648
  See application file for complete search history.

(56) References Cited

U.S. PATENT DOCUMENTS

| | | | |
|---|---|---|---|
| 4,016,296 | A | 4/1977 | DeSantis |
| 4,027,043 | A | 5/1977 | Schroeder et al. |
| 4,431,675 | A | 2/1984 | Schroeder et al. |
| 4,749,578 | A | 6/1988 | Benton et al. |
| 4,904,486 | A | 2/1990 | Donovan et al. |
| 4,957,769 | A | 9/1990 | Theuninck et al. |
| 5,236,717 | A | 8/1993 | Vinci |
| 6,085,691 | A | 7/2000 | Loehndorf |
| 6,168,803 | B1 | 1/2001 | Harris et al. |
| 6,374,771 | B1 | 4/2002 | Zwickle |
| 6,726,941 | B2 | 4/2004 | Ethington, Jr. et al. |
| 6,776,122 | B1 | 8/2004 | Magrath et al. |
| 6,777,019 | B1 | 8/2004 | Thornberg |
| 6,793,947 | B2 | 9/2004 | Bachmeier |
| 7,124,708 | B2 | 10/2006 | Rollmann et al. |
| 7,900,430 | B1 | 3/2011 | McCauley |
| 9,410,059 | B2 | 8/2016 | Fu et al. |
| 9,591,869 | B2 * | 3/2017 | Dhuyvetter et al. |
| 9,949,500 | B2 | 4/2018 | Dhuyvetter et al. |
| 11,129,396 | B2 | 9/2021 | Callaghan |
| 2003/0104112 | A1 * | 6/2003 | Bachmeier |
| 2006/0093726 | A1 | 5/2006 | Bachmeier et al. |
| 2013/0330307 | A1 | 12/2013 | Millan |
| 2013/0330308 | A1 | 12/2013 | Millan et al. |
| 2014/0272002 | A1 | 9/2014 | Fu et al. |
| 2016/0073660 | A1 | 3/2016 | Coles |
| 2016/0213755 | A1 | 7/2016 | Romero et al. |

OTHER PUBLICATIONS

Instructions for the safe use of :Hand Chain Blocks, pp. 1 and 2. Lifing Equipment Engineers Association , Bishop's Stortford, Herts, United Kingdom. (Year: 1988).*

Widowski, Tina, "Causes and Prevention of Tail Biting in Growing Pigs: A Review of Recent Research," University of Guelph (Department of Animal and Poultry Science), London Swine Conference—Conquering the Challenges, pp. 47-56 (Apr. 11-12, 2002).

O'Driscoll, Keelin et al. "The influence of a magnesium rich marine supplement on behaviour, salivary cortisol levels, and skin lesions in growing pigs exposed to acute stressors," Applied Animal Behaviour Science; vol. 145, Issues 3-4 (May 2013) pp. 92-101, Abstract Only.

Mikesell, Sarah. "What Makes Hog Slat's Grow-Disk Chain Superior?" The Pig Site, 4 pages (Jan. 26, 2015).

Miakkar, et al. "Feed Supplementation Block Technology—Past, Present and Future," FAO Animal Production and Health Paper 164, Jan. 2007, pp. 1-248.

International Search Report (Form PCT/ISA/210) for International Patent Application No. PCT/US2019/034431, with Notification of Transmittal and Information on Search Strategy, issued from the European Patent Office, dated Sep. 11, 2019, 6 pages.

Written Opinion (Form PCT/ISA/237) for International Patent Application No. PCT/US2019/034431, issued from the European Patent Office, dated Sep. 11, 2019, 9 pages.

* cited by examiner

SUSPENDABLE FEED BLOCK SYSTEM FOR ANIMALS AND METHOD FOR MAKING SAME

CROSS-REFERENCE TO RELATED APPLICATION

The present application claims priority to U.S. Provisional Patent Application No. 62/679,238 filed Jun. 1, 2018, which is incorporated herein in its entirety by reference.

FIELD

The present invention relates to a suspendable feed block system for providing feed supplement material to animals, and more particularly, a suspendable feed block system for providing feed supplement material containing a source of magnesium and/or other nutrients to animals. The invention also relates to a method of manufacturing the suspendable feed block system.

BACKGROUND

There is a need to provide feed supplements to animals, such as swine or other livestock, in a controlled manner which can deliver nutritional supplements which improve the animals' health and behavior.

Animals kept together in a pen or other enclosed areas, such as swine, may display undesired aggressive behavior towards each other. For instance, tail-biting has been a long observed problem in swine kept in confined areas. Tail-biting has been attributed to a variety of factors, including dietary deficiencies, crowding, uncomfortable environmental temperature and conditions, and so forth. These factors are believed to cause stress in the animal to the point that it engages in aggressive behavior, such as biting the tails of other animals in the case of swine. Some jurisdictions do not permit tail docking without veterinarian approval or there are other regulatory or practical limitations on this practice, so different proposed solutions have to be considered to address the tail-biting problem in swine. It has been previously suggested, for instance, to supplement the diet of swine with salt, magnesium, or other dietary nutrients in an effort to calm the animals and curtail the tail-biting behavior. However, with regard to supplements such as magnesium and certain other feed ingredients, it is important to have them ingested in the desired amounts, and to avoid excess consumption that is economically wasteful and potentially harmful to the animal. While individual feeding and mechanically metered feeding can be used to control consumption of key supplements and feed ingredients, these require labor or capital investment in feed metering systems or other costs.

Rigid feed blocks for livestock made by combining molasses and nutritional elements and other ingredients also have become widely used. Such blocks are generally highly palatable and thus attract animals, permitting the blocks to serve as a delivery vehicle for feed supplements or other feed elements provided on an ad libitum consumption basis. They also can have a consumption regulating feature, in that they generally must be consumed by licking or nibbling, rather than in large bites, which slows ingestion and controls consumption. Feed blocks of these types for livestock tend to be relatively heavy, e.g., about 25 pounds to 50 pounds or even heavier. This is necessary from a practical standpoint in order to provide a meaningful amount of supplement material which will be available to a group or herd of large animals for multiple days, weeks, or longer. The relatively heavy feed blocks have been deployed directly on the ground in locations where livestock graze or feed. The blocks resting on the ground can become contaminated or soiled. For animals kept in a pen or other limited-space enclosure, such as swine, placement of a large feed block on the ground or floor of the pen where the animals are confined is also problematic and undesirable.

Accordingly, a need exists for improved products and systems for supplying dietary supplements to animals, such as swine or other livestock. The present invention can fulfill these needs and provides further related advantages.

SUMMARY

It is a feature of this invention to provide a suspendable feed block system for animals, which comprises a) a feed block comprising a hardened mass of feed supplement material in block form, wherein the feed supplement material comprises a source of magnesium, and b) a feed block support having the feed block formed around and attached to the support, wherein the support comprises an elongated flexible element having a plurality of protuberances located intermittently along a length of the element, and at least one end of the elongated flexible element protrudes from the feed block and is fastenable to a separate suspending component used to mount the suspendable feed block system on a structure in a suspended manner above the ground or pen floor.

The present invention further relates to a method of manufacturing the suspendable feed block system for animals, which comprises using a biodegradable, edible, or biodegradable and edible, mold to form the feed block, such that the mold does not need to be removed before use. Swine and other livestock can eat the mold material, in the case of an edible mold, or can occupy themselves by peeling the mold material away from the feed block inside the mold.

The present invention further relates to a method of manufacturing the suspendable feed block system for animals, which comprises (a) placing or providing a solidifiable moldable mass comprising feed supplement ingredients in a container, wherein the feed supplement ingredients comprise a source of magnesium, (b) suspending the indicated support having intermittent protuberances along its length in the solidifiable moldable mass, and (c) hardening or allowing the hardening of the solidifiable moldable mass after the suspending of (b) to provide a suspendable rigid block having a block shape defined by the container, and wherein at least one end of the elongated flexible element protrudes from the rigid block and is fastenable to the separate suspending component. Optionally, the mold can be removed from the feed block.

It is to be understood that both the foregoing general description and the following detailed description are exemplary and explanatory only and intended to provide a further explanation of the present invention, as claimed.

The accompanying figures, which are incorporated in and constitute a part of this application, illustrate various features of the present invention and, together with the description, serve to explain the principles of the present invention. Similar referencing identifiers in different figures can refer to similar features unless indicated otherwise.

BRIEF DESCRIPTION OF DRAWINGS

The present invention can be even more fully understood with the reference to the accompanying drawings which are intended to illustrate, not limit, the present invention.

DETAILED DESCRIPTION

Figure 1:
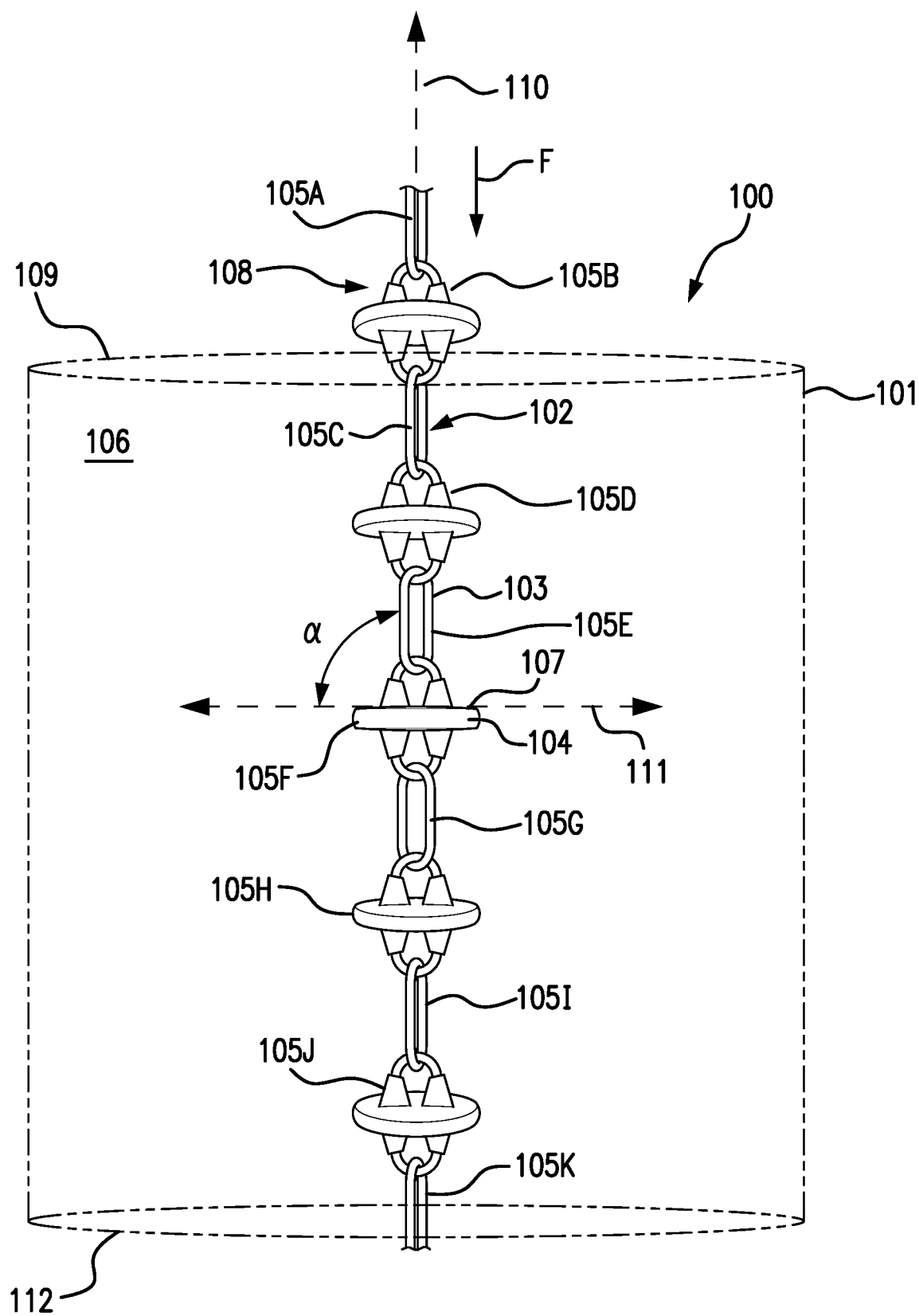
FIG. 1 is a partial perspective view of a suspendable feed block system according to an example of the present application.

The present invention relates to a suspendable feed block system for animals, which provides a feed block comprising a hardened mass of feed supplement material containing a magnesium source and/or other supplements in suspendable block form. The feed block is made suspendable by incorporating a support in the mass of feed supplement material before hardening, wherein the hardened mass of feed supplement material is able to form around and integrally attach to the support. The hardened mass of feed supplement material that forms the feed block is anchored well onto the support since the support comprises an elongated flexible element having a plurality of protuberances located intermittently along the element. The protuberances extend transversely or substantially transversely (laterally) into the feed block in which the support is embedded. If animals, especially heavy livestock such as swine, pull or push down or put body weight on the suspended feed block of the present invention during feeding from the block, the protuberances help to prevent the feed block from being pulled off the support and dropped to the ground or pen floor. The protuberances also help to hold the block together and minimize fracturing of the block into large pieces over time. At least one end of the elongated flexible element is fastenable to a separate suspending component, e.g., a separate chain, used to mount the feed block system to a fence, gate, post, ceiling joist, tree, or other (semi)-permanent man-made or natural structure from which the feed block can be suspended above the ground or pen floor (outdoors or indoors). The at least one end of the elongated flexible element can be fastenable, for example, by being provided with a loop, hook, link, lanyard, S-hook, or the like. The suspended feed blocks can be fed to animals in confinement or those more freely ranging in pasture and the like as long as an indicated structure is available from which to hang the feed block above ground. The suspendable feed block system can be housed in a removable container in which it has been manufactured, which can be removed before deploying the feed block system. Alternatively, the container housing the feed block can be left on the feed block, which the animals can chew through to reach the suspended feed block.

The suspendable feed block system provides an excellent delivery system for magnesium and/or other supplements to livestock, such as swine or ruminants, or other animals. The magnesium obtained by the animals from the suspended feed block can help to reduce or prevent tail-biting in pigs, aid in the prevention of grass tetany in beef cattle on pasture, or provide other health and/or behavioral benefits to these or other livestock. The livestock that can be supplemented with the suspendable feed blocks also can include dairy cattle, horses, goats, or sheep. Wildlife (e.g., deer) and zoo animals also can be supplemented with the suspendable feed block systems of the present invention. As indicated, in instances where large mammals have unrestricted access to a feed block containing the nutrient and/or medicinal supplement(s), the robustness of the system of the present invention is especially important.

According to embodiments of the present invention, the feed block can be molded inside a feed block mold that comprises a biodegradable material. The biodegradable material can be in the shape of a container having inner dimensions that compliment desired outer dimensions of the feed block. The biodegradable material of the feed block mold can be edible or can be consumable but does not necessarily have to exhibit nutritive properties. The biodegradable material can comprise or consist of a paper product, wood pulp, construction paper, compressed saw dust, cottonseed meal, pyrite, rice paper, natural glue, fruit peel, orange peel, wheat, straw, recycled paper, other plant-based materials, combinations thereof, and the like. Edible or consumable feed block mold materials can be consumed by livestock or unwrapped by livestock to expose the feed block core.

Exemplary feed block mold materials that can be biodegradable, edible, or both, can include Corrugated Sheet materials available from International Paper Memphis, Tenn. Corrugated Sheet materials contain 95-99% weight/weight cellulose pulp (CAS No. 65996-61-4) and 1-4% weight/weight base-hydrolyzed, borated starch (CAS No. 69898-30-2). Exemplary feed block mold materials that are biodegradable, edible, or both can contain about 94% by weight or more pre-consumer recycled Kraft corrugated box trimmings, for example, 98% by weight. An exemplary method of forming a feed block mold material that is biodegradable, edible, or both, can involve using a paper feedstock material known as "DLK" or Double Lined Kraft. The paper or paperboard is clean, sorted, unprinted, corrugated cardboard cartons, boxes, or sheets or trimmings from new box-converting operations. The cuttings are extremely clean and dry.

The kraft paper is put into a hydro pulper or other giant blender and water is added to make a slurry of paper fibers and water. No other ingredients are added to the material to form the animal feed block mold, besides paper and water, although slight amounts of starch can be added as a binder, if desired. A vacuum is used to pull the paper slurry onto hollow screened molds. The paper fibers align themselves onto the mold screen and the water is extracted through the hollow molds. After forming the mold, the vacuum is shut off and the machine cycles and uses compressed air to blow the container (which has a moisture content of approximately 70%) off the mold onto a continuous belt and into a natural gas drier. The containers are dried to approximately 10% moisture content, inspected, and stacked onto pallets for shipping. This process can also be used with the Corrugated Sheet materials described above.

Referring to FIG. 1, suspendable feed block system, indicated by numeral 100, is shown. A feed block 101 is indicated in phantom lines so that the feed block support 102 embedded within feed block 101 can be seen and referenced for this discussion. For purposes of this illustration, the feed block 101 is a generally cylindrical structure overall, although other shapes can be used, such as described herein. The feed block 101 comprises a solid mass of hardened feed material 106, which contains one or more nutrient and/or medicinal supplements, such as magnesium. The feed block support 102 is embedded within the mass of hardened feed material 106, which is formed around and attached to the support 102. The support 102 has an elongated flexible element 103, which is a chain in this embodiment, and intermittent protuberances 104, which are disc-shaped in this embodiment, located at fixed locations along the length of the chain 103. The chain 103 is comprised of interconnected chain links 105A-K for purposes of this illustration. The support 102 is not limited to this number of links, and it may vary depending on the relative sizes of the feed block and chain used as the support. In this embodiment, the protuberances 104 are present on every other chain link along the length of the chain in a regular sequence, i.e., on chains links 105B, 105D, 105F, 105H and 105J with a single intermediate chain link spaced between them that has no protuberance. The protuberances 104 also may be provided in other sequences along the chain 103, such as on every chain link, or as spaced part by 2 or more intermediate links that have no protuberance, or arranged in other regular or irregular sequences with intermediate links that have no protuberance.

The top portion 108 of the support 102 protrudes from the top surface 109 of the feed block 101 and is connectible to a separate mounting element (not shown in this figure). The top portion 108 thus is exposed and accessible to the animals. The elongate flexible element 103 of the support 102 should be a material which is strong enough to support the weight of the feed block 106 and which the animals cannot chew or bite through or break by pulling or pushing down on the feed block 101. The elongate flexible element 103 can be, for example, a metal chain, cable or rope or other strong elongate flexible material. The chain material can be metal, such as stainless steel chain or link chain (e.g., SS304 or SS316 or others), lashing chain (e.g., grade 40 or higher), metal alloy chain (e.g., grade 70 or higher), or other heavy duty chain material. The chain can comprise a plurality of toroidally-shaped chain links that are oval, circular, or squared oval in profile or have other linkable geometries that are linked together during chain manufacture. Other elongated flexible elements can be used instead of chain in the support 102, such as a length of stranded or solid cable or rope, provided that protuberances, such as described herein, can be provided in fixed locations intermittently along their length. The term "flexible", as used herein, refers to the original capability of the elongated element to be manually twistable, bendable or otherwise manipulatable out of a lengthwise direction before it is immobilized in the hardened feed block, unlike a rigid post, shaft or similar structural element.

The protuberances 104 can extend generally laterally away from the length of chain 103. The protuberances 104 can extend transversely or substantially transversely from the chain links 105B, 105D, 105F, 105H, and 105J of the length of chain 103 on which they are attached into the hardened mass of feed supplement material 106. The protuberances 104 can comprise planar or substantially planar portions 107 which extend transversely or substantially transversely from the chain 103. That is, the angle α formed between the plane or line 111, which is coextensive with a generally planar upper surface 107 of protuberance 104, and the longitudinal axis 110 of the chain 103, can be from about 45° to about 100°, or from about 65° to about 95°, or from about 85° to about 95°, or from about 80° to about 90°, or from about 85° to about 90°, or about 90°. As can be appreciated, any angling of the protuberances 104 toward the top end 109 of the feed block system 101 away from a true perpendicular angle for α can be better tolerated than angling of the protuberances toward the opposite bottom end 112 of the system 101, since animal-applied forces F of concern typically will be applied generally downward on the system 101, as well as the force of gravity. In a preferred embodiment, most or all of the protuberances embedded in the feed block extend transversely or substantially transversely from the chain links, e.g., at least 50%, or 60%, or 70%, or 80%, or 90% or 100% of the protuberances. In one embodiment, the protuberances extend at an angle α which is substantially perpendicular or perpendicular to the longitudinal axis 110 of the length of chain 103, which can be angle α of from about 85° to about 95°, or about 90°.

Figure 2:
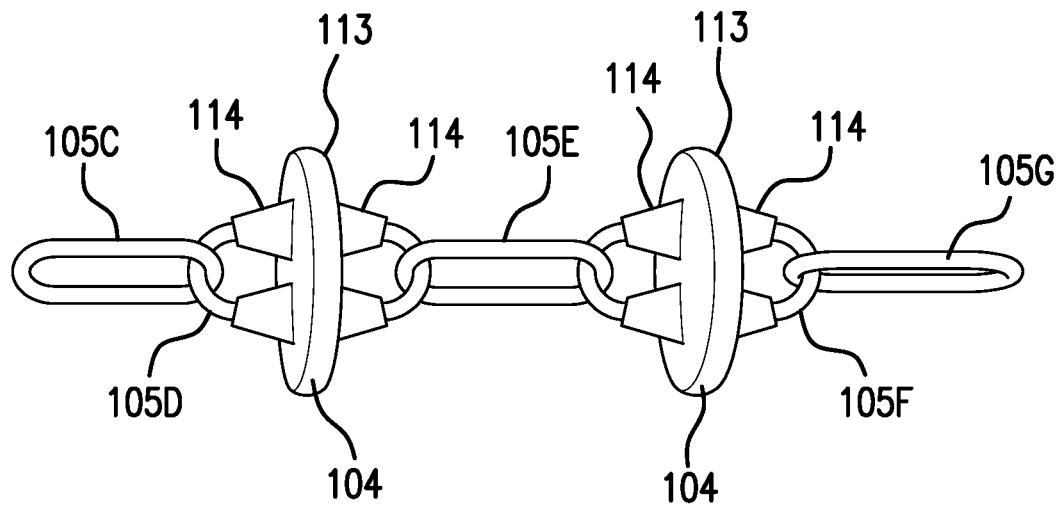
FIG. 2 is a side view of a portion of a feed block support shown in FIG. 1 according to an example of the present application.
Figure 3:
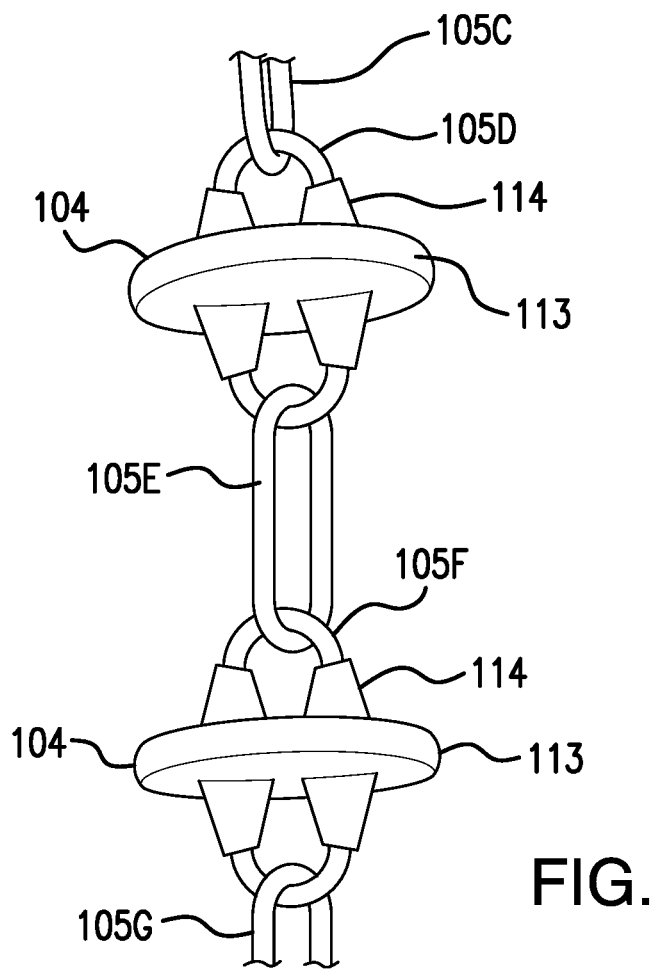
FIG. 3 is a perspective view of the portion of support suspension arrangement for manufacturing the suspendable feed block system according to an example of the present application shown in FIG. 2 according to an example of the present application.

As shown in more detail in FIG. 2, which shows a segment of the chain 103 of FIG. 1 which also is representative of the remainder of the chain, the protuberances 104 on chain links 105D and 105F are rigid polymeric material formed into central disk-shaped portions 113 that are integrally attached over a central part of the links 105D and 105F. The protuberances 104 also can include link sheathing parts 114 which extend along a portion of the length of the links 105D and 105F at both sides of each central disk-shaped portions 113. Sheathing parts 114 can help to further stabilize the attachment of the central disk-shaped portions 113 to the chain links. FIG. 3 shows in more detail the solid generally planar feature of the disk-shaped portions 113 of protuberances 104 and the sheathing parts 114. Though shown as having disk-shaped central portions in this embodiment, the protuberances can generally comprise planar or substantially planar geometrical configuration portions selected from the group consisting of circular, oval, polygonal, star, and combinations thereof, or planar or substantially planar shapes of irregular geometries.

To form the protuberances on the chain, the polymeric material can be injection molded or cast onto the chain with molding dies used to impart the desired shape of the protuberance. Disked-feed conveyor chains also can be commercially obtained which can be re-purposed for the present invention. The polymeric material can be polypropylene, polyethylene terephthalate (PET or PETE or polyester), high density polyethylene (HDPE), polyvinyl chloride (PVC), low density polyethylene (LDPE), polystyrene (PS), or other polymeric materials.

In one embodiment, the protuberances, such as the disk-shaped protuberances, can have a diameter of from about 0.75 inch to about 3.5 inches (about 2 cm to about 9 cm), or from about 1 inch to about 3 inches (about 2.5 to about 7.5 cm), or from about 2.25 to about 2.75 inches (about 5.7 cm to about 7 cm), or about 2.5 inches (about 6.4 cm), or other values. The protuberances can be spaced apart along the length of the chain at intervals of from about 1 inch to about 4 inches (about 2.5 to about 10 cm), or from 1.5 inches to about 3.5 inches (about 4 to about 9 cm), or other values. The protuberances can be located intermittently at these or other periodicities along a chain or other support that extends through at least about 50%, or 60%, or 70%, or 80%, or 90%, or 95%, of the entire height of the feed block.

The feed block in which the support with protuberances is embedded can have a weight (mass) of from about 10 to about 50 pounds (~4.5 to 23 kg), or about 15-34 pounds (~6.8-15 kg), or about 20-35 pounds (~9-16 kg), or about 23-27 pounds (~10-12 kg), or about 25 pounds (~11 kg), or other amounts, based on the weight of the hardened feed material.

Though FIG. 1 shows the feed block 101 having a circular cross-sectional shape and an overall cylindrical shape, the feed block can have a rounded shape, a polygonal shape, or other regular or irregular geometrical shape, from a cross-sectional or top view perspective. The feed block, for instance, can have a circular, oval, or other curved geometrical shape, from a cross-sectional or top view perspective. The feed block alternatively can have a polygonal geometrical shape, from a cross-sectional or top view perspective, such as a polygon having 3 to 12 external sides, or 4 to 12 sides, or 5 to 12 sides, or 6 to 12 sides, or 5 to 9 sides, or 6 to 10 sides, or 7 to 9 sides, or 3 (triangular), 4 (e.g., square, rectangular, rhomboid), 5 (pentagonal), 6 (hexagonal), 7 (heptagonal), 8 (octagonal), 9, 10, 11, or 12 sides, or other numbers of sides.

To suspend the suspendable feed block system of the present invention above the ground or a pen floor, it is necessary to join a free (exposed) end of the suspendable feed block support system (e.g., a chain segment having the protuberances) to a separate external chain segment used to mount the suspendable feed block system to a support structure, such as a gate, fence, ceiling joist, post, or other structure (e.g., enclosure structure, building structure, or other structure).

Figure 4:
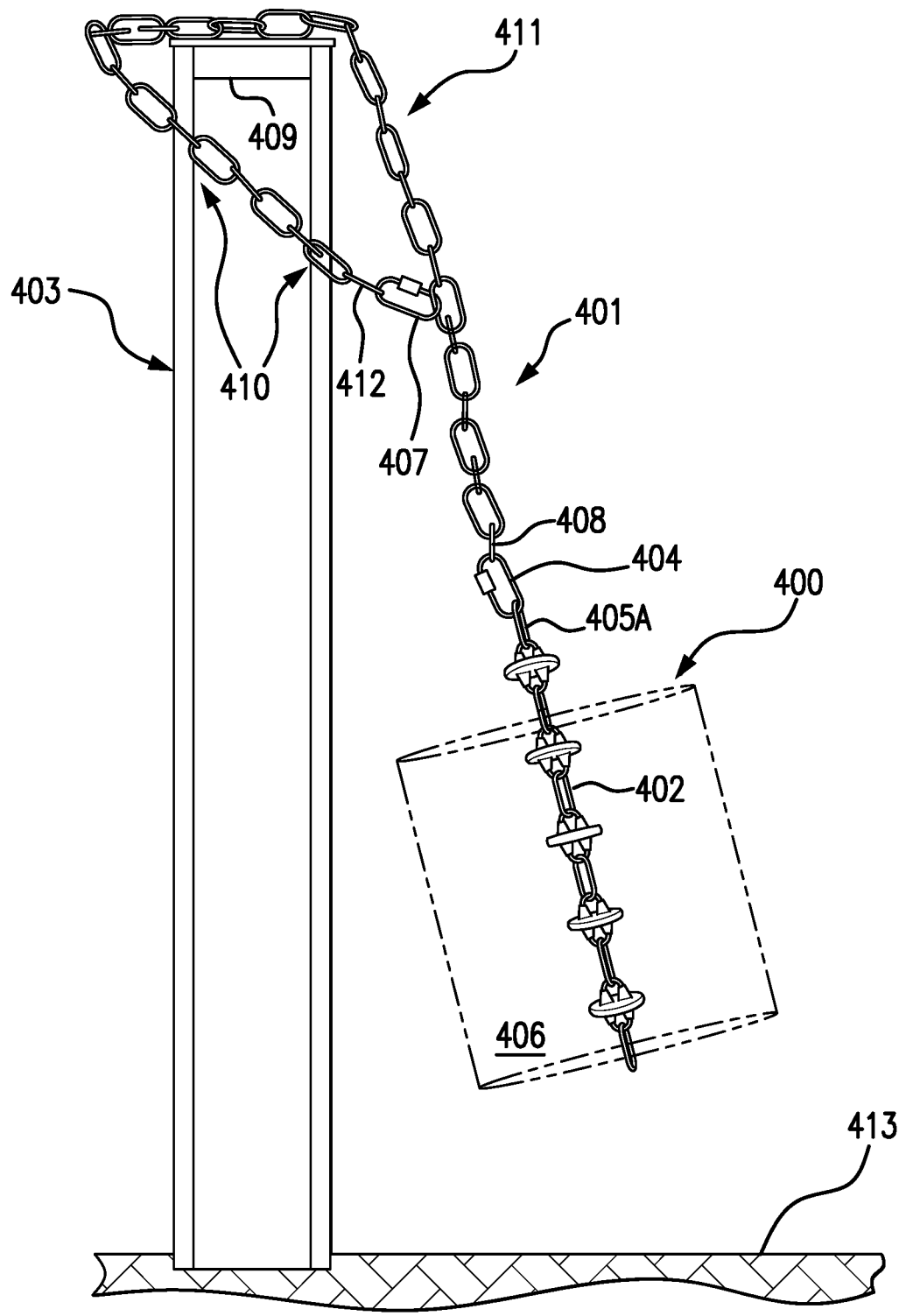
FIG. 4 is a side view of a suspendable feed block system mounted on a gate/fence structure in a suspended configuration above the ground according to an example of the present application.

Referring to FIG. 4, a suspendable feed block system 400, which corresponds to the system 100 shown in FIG. 1, is joined at an upper exposed link 405A of the support 402 with protuberances (which corresponds to support 102 in FIG. 1) to a lower link 408 of a separate length of mounting chain 401 with a chain link connector 404. Most of the length of the support 402 with protuberances is embedded in a solid mass of hardened feed material 406 (which corresponds to material 106 in FIG. 1) to anchor the feed block 406 to the support 102.

While FIGS. 1 and 4 show the support, 102 and 402, respectively, extending substantially or wholly through the hardened feed material, 106 and 406, respectively, it is to be understood that the support can be made to extend less than all the way through the hardened feed material, for example, from 50% to 95% of the way through, from 65% to 90% of the way through, from 75% to 85% of the way through, or about 80% of the way through. For example, for a hardened feed block having a height of 10 inches, the support can extend from the top down to 8 inches into the block.

While FIGS. 1-4 and 7-9 show the respective supports having protuberances along the lengths thereof, supports can also be used that are free of protuberances, for example, lengths of metal chain links. While protuberances can facilitate maintaining the hardened feed block secured to the support, metal chains can provide a similar effect, especially when robust links are used. For example, chains having links that each have an overall length that is not more than 4 times the overall width thereof, can be used. Links having lengths that are from 2 to 3 times the width can be used.

The assembly 411 comprised of the suspendable feed block system 400 and mounting chain 401 can be mounted to a gate or fence 403 in the embodiment shown in FIG. 4. In this illustration, the mounting chain 401 is wrapped over the top of a top rail or slat 409 of a gate or enclosure that encloses part of an animal pen, pasture, or other enclosure. The gate or fence has openings 410 below the top rail or horizontal slat 409 through which the free end 412 of the mounting chain 401 can be passed back to the side of the gate or enclosure 403 where the system 400 is to be suspended, i.e., the animal feeding side. The free end 412 of mounting chain 401 can be connected to itself with another chain link connector 407. In this manner, for example, the suspendable feed block system 400 can be suspended above the ground or floor 413 of an animal pen, enclosure, or pasture or other location where the animals will feed. The length of the mounting chain 401 needed will depend on the mounting structure. The mounting of the feed block system 400 to a gate or fence may only require a mounting chain 401 of about 2 to about 6 feet in length, whereas mounting the feed block system 402 from a joist or other ceiling structure of an animal shed or barn may require a mounting chain of longer length.

Depending on the height of the gate or enclosure, the mounting chain also may be wrapped around a rail or horizontal slat below the top rail or slat as long as the suspendable feed block system is mounted in a suspended position above the ground or floor. For feeding of most livestock, it typically will be desirable to suspend the suspendable feed block system at a height above the ground or floor that is not substantially higher and preferably no higher than the normal standing upraised head height of the animals being fed. For swine, for example, the suspendable feed block system preferably is suspended at a height above the ground which will approximately correspond to the typical head height of the pigs being supplemented. In one embodiment, the suspendable feed block system is suspended at least about one foot (30 cm) above the ground (e.g., dirt or grass) or pen floor (e.g., a concrete pen floor), or from about one foot to about four feet (30 cm to about 122 cm), or from about one foot to about three feet 30 cm to about 91 cm), or other suspension heights. The suspended feed block system should be suspended off of the floor or ground so that the hardened feed block can be freely suspended and can rotate so that consumption can be equal across the block. One or more swivel components or swivel links can be included to promote free rotation or spinning of the block.

The joinder of the separate chain segments, such as the chain portion of support 402 and the mounting chain 401 of FIG. 4 (typically, at chain links at or near free ends of the respective chain segments), and the joinder of the mounting chain 401 to itself in FIG. 4, each can be achieved by using a closeable link connector. The chain connectors, such as chain connectors 404 and 407 shown in FIG. 4, preferably are manually connectible and disconnectible for convenience, yet tamper-proof to animals. The chain connector can be, for example, a quick link, a spring link, a carabiner clip, a screw pin anchor shackle, clevis slip hook, or other connectors which can be used to connect links of separate chain segments in a releasable manner. A chain connector can be, for example, a quick connect coupling link, which is often referred to as a "quick link" for short. Examples of a quick link are shown in U.S. Pat. No. 7,900,430. A quick link can comprise a generally c-shaped body and a closure, wherein the c-shaped body includes two ends that confront each other in a spaced-apart relation and each end of the body is provided with an external, helical thread set that extends from each end towards the body. The closure includes a cylindrical piece which has a threaded interior surface which engages and mates with each of the thread sets at the ends of the body. The closure is movable between a first or open position, which exposes a gap between the ends of the body, and a second or closed position that closes the gap between the ends of the body. FIG. 4 generally shows a quick link 404 used as the fastener to join the feed block chain support 402 to the mounting chain 401, and a quick link 407 used to fasten the mounting chain 401 to itself. Other kinds of chain connectors which permit releasable coupling of separate chain segments and separate chain links of the same chain also can be used.

Figure 5:
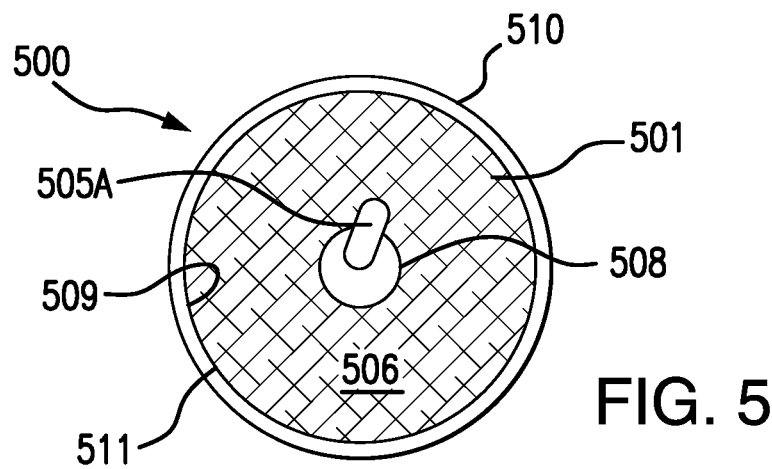
FIG. 5 is a plan view of a suspendable feed block system according to an example of the present application.

The suspendable feed block system can further include a removable container in which the feed block is housed. Referring to FIG. 5, a suspendable feed block system 500, which corresponds to the system 100 shown in FIG. 1, has a suspendable feed block 501 that is housed in a container 510. The container 510 can be cardboard (e.g., double-faced corrugated cardboard), waxed cardboard, plastic, or other materials. The container 510 should be sufficiently sturdy to maintain its shape while containing the feed block 501 without easily deforming. The container 510 has an inner sidewall 509 which can define the exterior shape 511 of the feed block 506 if the container 510 is used as mold container during formation of the feed block system 501, as described in more detail in connection with FIGS. 6-7 herein. If the container 510 is not removed and is left on the feed block at the time of deploying the suspendable feed block system 500 at an animal feeding area, the container should be chewable construction that the animals can nibble or bite through without harming the animal (e.g., cardboard). A support with protuberances (which is not fully shown in FIG. 5, but can correspond to support 102 in FIG. 1) is embedded in hardened feed material 506 and has an exposed upper end 508 with at least one free chain link 505A that is not embedded in the feed block 501 of system 500. Exposed chain link 505A is connectible to a separate mounting element, such as element 401 shown in FIG. 4, used in suspending the suspendable feed block 500.

Though shown with a circular inner sidewall in the embodiment of FIG. 5, the container can comprise an inner sidewall which can be rounded or polygonal from a cross-sectional perspective. The shape of the inner sidewall of the container feed block can be complementary to the external peripheral shape of the feed block housed inside it. If rounded, the inner sidewall of the container can be circular, oval, or other curved geometry. If polygonal, the inner sidewall of the container can comprise 3 to 12 sides, or 4 to 12 sides, or 5 to 12 sides, or 6 to 12 sides, or 5 to 9 sides, or 6 to 10 sides, or 7 to 9 sides, or 3, 4, 5, 6, 7, 8, 9, 10, 11, or 12 sides, or other numbers of sides.

The feed blocks, such as feature 106 in FIG. 1, feature 406 in FIG. 4, and 506 on FIG. 5, are relatively solid masses formulated to contain and present a feed supplement of relatively small amounts of one or more nutritional or medicinal ingredients, such as magnesium, to animals for ad libitum consumption. These kinds of feed blocks can be made, in general, by several methods indicated below as methods 1), 2), and 3), which can be adapted to make the feed block component used in the suspendable deed block system of the present invention:

1) Poured/chemical blocks, which are made by hardening the combined ingredients of the product with chemical reactions between water and mineral oxides, and the reactions used to cause hardening can vary. Examples of such blocks are found, e.g., in U.S. Pat. No. 4,016,296 (DeSantis), U.S. Pat. No. 4,027,043 (Schroeder), U.S. Pat. No. 5,236,717 (Vinci), U.S. Pat. No. 6,726,941, (Ethington, Jr. et al.), U.S. Pat. No. 6,793,947 (Bachmeier), and U.S. Pat. No. 4,957,769 (Theuninck et al.).

2) Pressed and hybrid blocks are made by blending ingredients, conditioning them, and placing them under pressure, which may or may not include heat, with an optional binding agent to attain hardness. Examples of such blocks are found, e.g., in U.S. Pat. No. 3,532,503 (Kviesitis). Kviesitis and U.S. Pat. No. 6,168,803 (Harris).

3) Low-moisture blocks are made by dehydration of the base ingredient, usually a molasses or molasses derivative, through thermal evaporation. Here too, there are hybrids, which may be formulated to achieve a particular physical objective. Examples of low moisture blocks are found, e.g., in U.S. Pat. No. 4,749,578 (Benton et al.) and U.S. Pat. No. 3,961,081 (McKenzie), and U.S. Patent Appln. Publication No. 2014-0272002 A1 (Fu et al.).

Though poured blocks are illustrated herein, a feed block used in the suspendable feed block system of the present invention may incorporate a feed block of any of these indicated types 1), 2), or 3), or other types of feed blocks, which have a flowable unhardened state such that the feed supplement materials can be filled into and hardened in place in a container.

Figure 6:
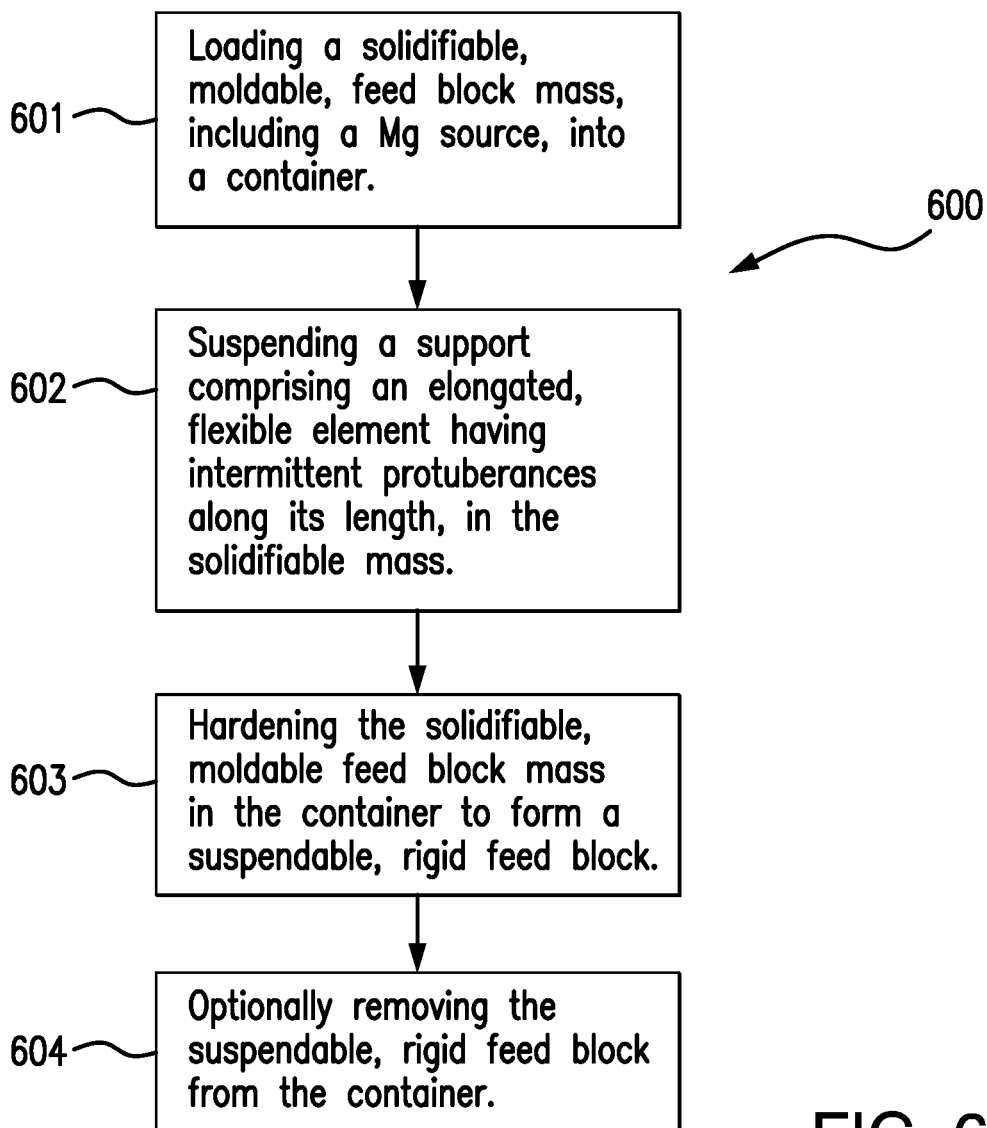
FIG. 6 is a process flow diagram of a method of manufacturing a suspendable feed block system according to an example of the present application.

Referring to FIG. 6, a process flow 600 is shown of a method for manufacturing a suspendable feed block system for animals of the present invention. The method comprises steps 601, 602, 603 and optional further step 604. In step 601, a solidifiable moldable mass which comprises feed supplement ingredients, such as one of the kinds of block-forming masses described above, is placed or provided in a container. In a preferred embodiment, the feed supplement ingredients comprise a source of magnesium. In step 602, a support is suspended in the solidifiable moldable mass, wherein the support comprises an elongated flexible element having a plurality of protuberances located intermittently along a length of the element, such as described herein. The support can be suspended in the solidifiable moldable mass by various techniques. As one technique, the elongated flexible element can be immersed into the solidifiable moldable mass that has already been poured into or otherwise placed in a molding container, but has not yet been hardened or allowed to harden. Alternatively, the elongated flexible element can be suspended in an empty space defined by the molding container before pouring the solidifiable moldable mass around the elongated flexible element as pre-suspended within the container when empty. In step 603, the solidifiable moldable mass is hardened or allowed to harden after the suspending of elongated flexible element in the hardenable mass to provide a suspendable rigid block having a block shape defined by the inner sidewall or sidewalls of the container. At least one end of the elongated flexible element is left exposed above the hardenable mass before the hardening to provide a fastenable end thereof. In an optional further step 604, the suspendable rigid block can be removed from the molding container. For example, if the container is formed of plastic, after hardening the feed block in the container, the container and enclosed suspendable feed block can be flipped over, and the enclosed suspendable feed block can be readily knocked out and removed from the container. Alternatively, the molding container can be left assembled with the suspendable feed block as a component of the suspendable feed block system.

As indicated, the suspendable feed block can be directly formed in its packaging container in an embodiment of the present invention. As another option, the suspendable feed block can be formed in a temporary molding container, then removed from the temporary molding container after hardening the feed block, and optionally packaged in a different kind of container for handling and/or use.

Figure 7:
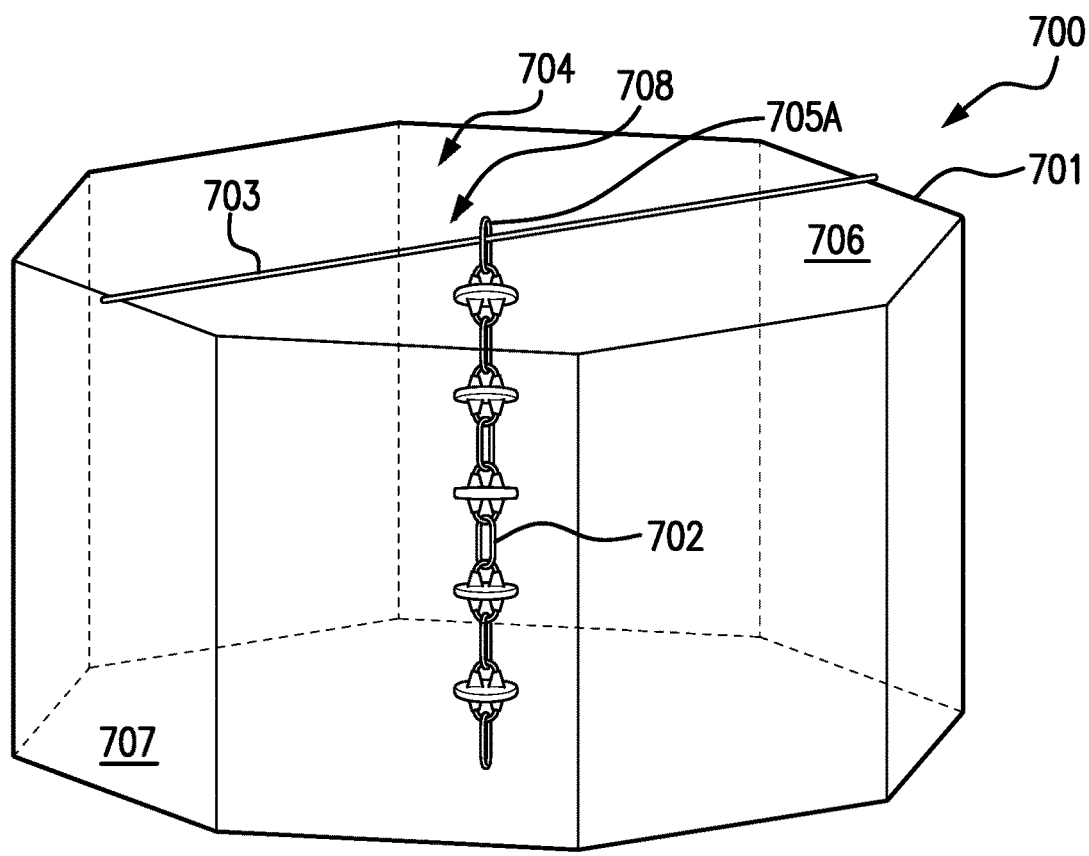
FIG. 7 is a perspective view of a container box and support suspension arrangement for manufacturing the suspendable feed block system according to an example of the present application.

Referring to FIG. 7, a manufacturing set-up 700 for an embodiment of the present invention is shown which comprises a molding container 701 and a support 702, which comprises an elongated flexible element having a plurality of protuberances located intermittently along a length of the element, such as described herein, which is suspended into the container 701 using a crossbar 703 such as a dowel or other elongated support member, which rests on opposite sides of the container 701 and spans across the open top 704 of the container 701. The container 701 has an inner volume 708 defined by the inner sidewalls 706 and bottom 707 of the container 701. The crossbar 703 can be passed through an upper chain link 705A of support 702 to suspend the support 702 in the inner volume 708 of the container 701.

Figure 10:
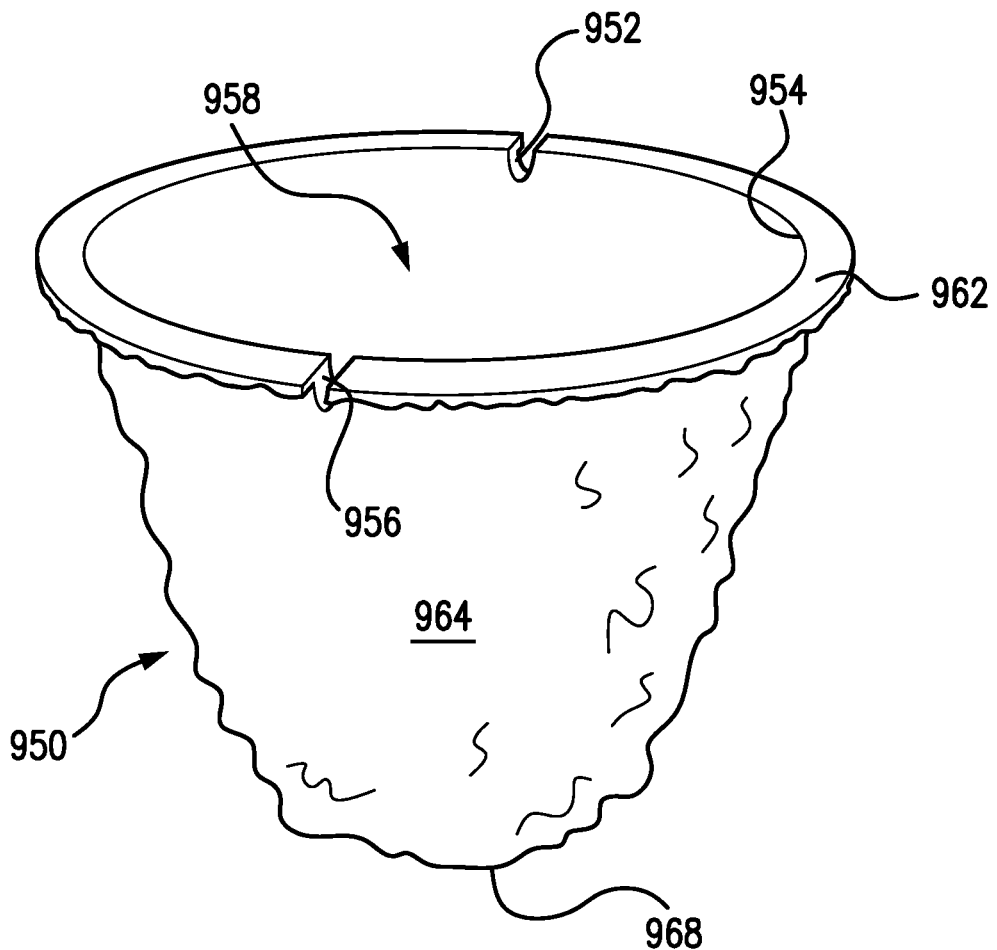
FIG. 10 is a perspective front view of a biodegradable and/or edible feed block mold that can be used to mold the hardenable feed block material into a feed block, and which can remain on, and as part of, the hardened feed block.
Figure 11:
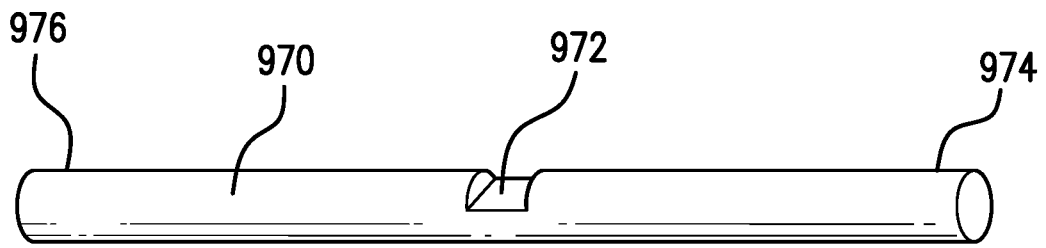
FIG. 11 is a perspective top front view of another support suspension arrangement for manufacturing the suspendable feed block system according to an example of the present application, and includes a notch at the middle of its length, to maintain a feed block support centrally suspended in a feed block material during hardening of the material.

The crossbar 703 can have a notch, groove, pins, or one or more other centering features formed in the top center thereof to prevent the upper chain link 705A of the support 702 from sliding along the crossbar 703. The notch, groove, or other centering feature(s) can keep the support 702 suspended and centered in the middle of container 701 during hardening of the feed block material. An exemplary crossbar having a notch is shown in FIG. 11 described below. The container 701 is an octagonal shaped box for this illustration, but can have other shapes, such as described herein. Shapes can be used that have no corners at all or no corners along a sidewall thereof. Round shapes can be used. An exemplary round-shaped container that can be used is shown in FIG. 10, described below.

The container 701 can have notches, grooves, channels, or other recesses formed at opposite locations in the top edge or rail thereof to accommodate crossbar 703 and to prevent crossbar 703 from moving on the top of container 701. V-shaped or U-shaped grooves or channels can be used to stabilize and/or secure crossbar 703 and dimensions can be used to enable a snap-fit or friction fit of the crossbar 703 in the grooves or channels.

The inner volume 708 of the container 701 can be prefilled with hardenable feed material before suspending the support 702 using cross bar 703 and immersing the support 702 therein. Alternatively, the support 702 can be suspended into an empty inner volume defined by container 701 and the hardenable feed mass can be poured around the suspended support 702 and hardened thereafter. The cross bar can be left with the hardened block or removed.

Figure 8:
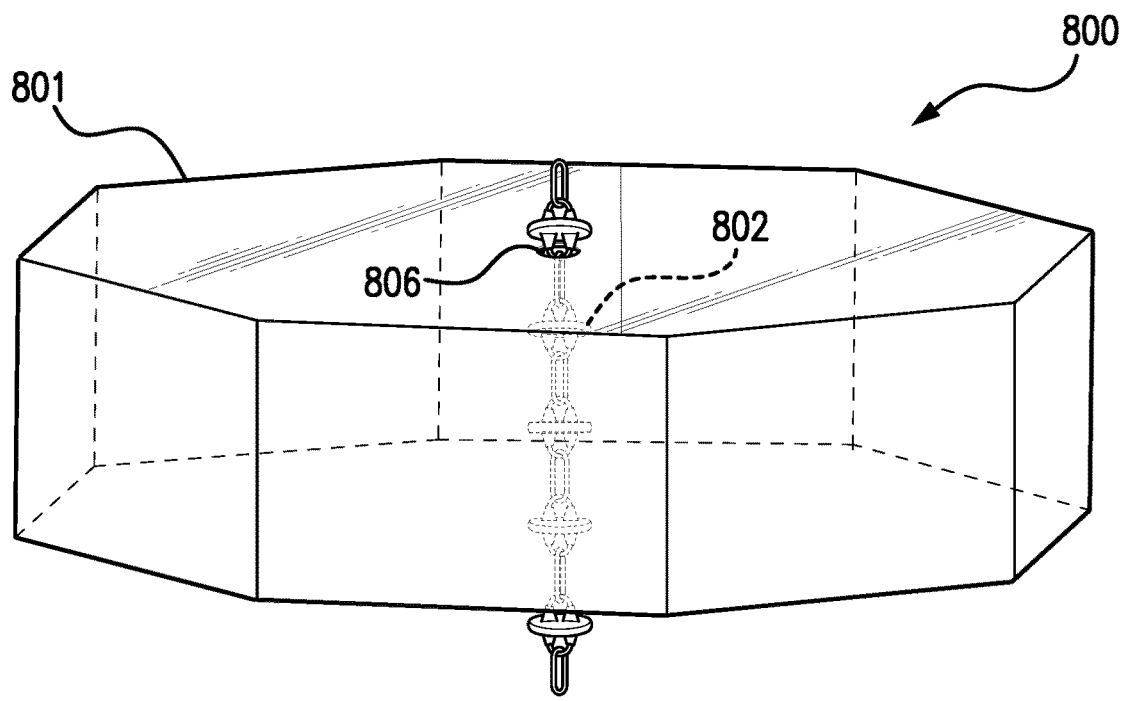
FIG. 8 is a perspective view of a container cap and support suspension arrangement used in manufacturing the suspendable feed block system according to an example of the present application.

Referring to FIG. 8, a cap assembly 800 is shown which can be used in a method of manufacturing a suspendable feed block assembly according to an embodiment of the present invention. Cap assembly 800 comprises a container cap or lid 801 and a support 802, which comprises an elongated flexible element having a plurality of protuberances located intermittently along a length of the element, such as described herein, wherein the support 802 has a part hanging downward from the inner side of the cap 801. The assembly 800, that is, the cap 801 with the suspended support 802, can be placed over an open top and outer sides of a complementarily-shaped container (not shown), such as container 701 shown in FIG. 7. A chain link or links at a free upper end of a chain type support with the intermittent protuberances, for example, can be passed through a small opening 806 or slot in the cap and/or twisted over the top of the cap. Opening 806 can be small enough to prevent support 802 from passing therethrough, for example, small enough to capture support 802. The support can dangle freely from opening 806. While holding the free end of the chain, and after pouring the hardenable feed supplement material into the container, the cap with the chain on can be placed on the container and the chain can sink into the unhardened feed supplement material. The material can then be hardened or allowed to harden. The cap can be left on the hardened block or removed. The cap can comprise a material that is biodegradable, edible, or both. The material of the cap can, but does not necessarily, provide nutritive properties.

Figure 9:
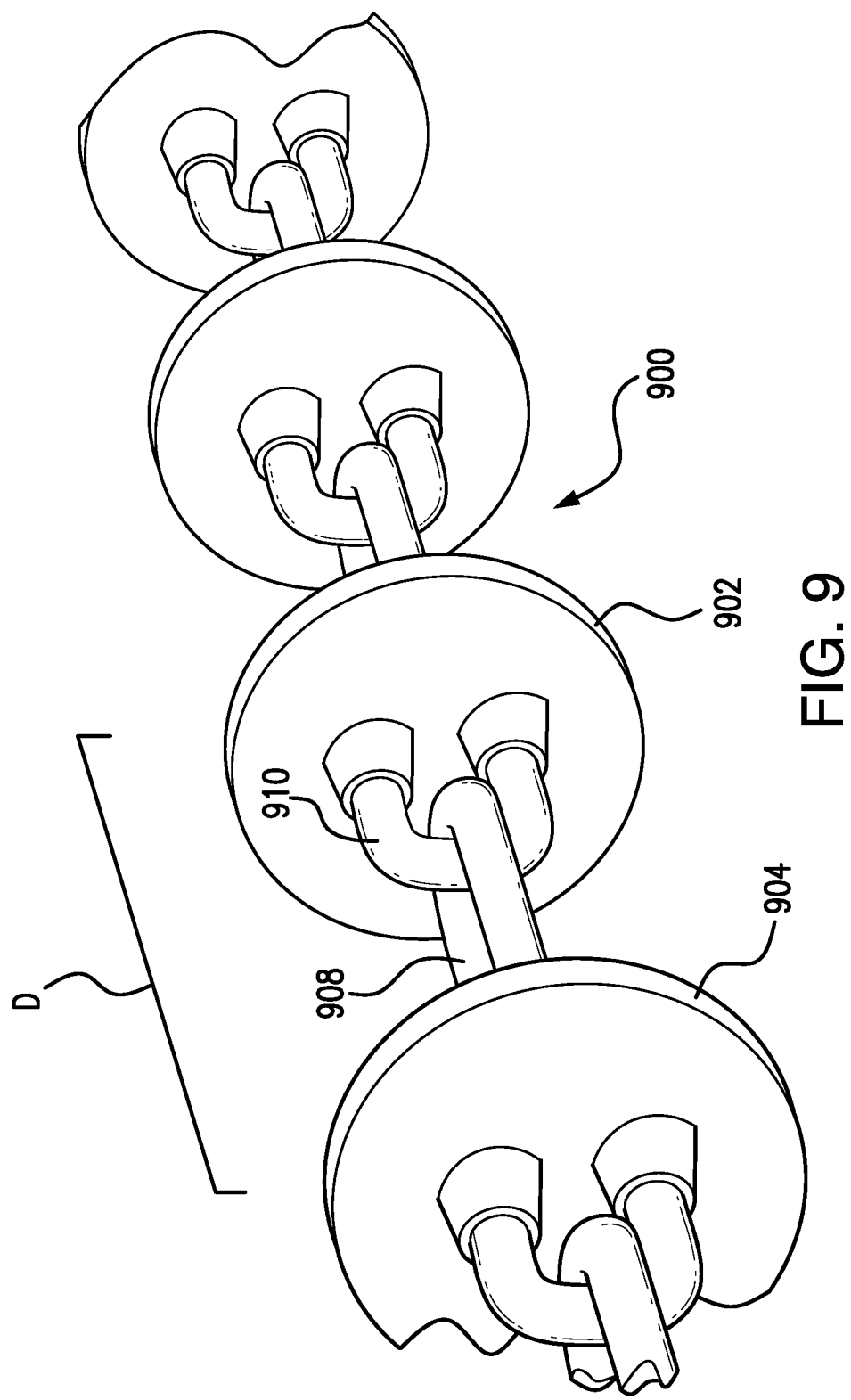
FIG. 9 is a perspective side view of a portion of a feed block support according to an embodiment of the present teachings.

FIG. 9 depicts another feed block support 900 that can be used in the suspendable feed block system of the present invention. Feed block support 900 can be embedded within a mass of hardened feed material that can be formed around and encompass feed block support 900. Feed block support 900 can be in the form of an elongated flexible element including a plurality protuberances 902, 904 spaced apart and along the length of the elongated flexible element. The elongated flexible element can comprise a chain of links 908 and links 910, linked together as shown. Each link 910 is configured to pass through a respective protuberance 902, 904. Sheathing parts can be included to stabilize the attachment of links 910 to the protuberances. The shape, size, spacing, and materials used to make feed block support 900 can be the same as those used for feed block support 102 shown and described with reference to FIGS. 1-3.

As shown in FIG. 9, protuberances 902 and 904 are disc-spaced and spaced apart from one another by a distance D. Distance D can be, for example, from about 1 inch to about 4 inches (from about 2.5 cm to about 10 cm), from about 1.5 inches to about 3.5 inches (from about 4 cm to about 9 cm), from about 2 inches to about 3 inches (from about 5 cm to about 7.5 cm), or the like. Each protuberance can be equally spaced apart from adjacent protuberances, or the spacing can vary. Feed block support 900 can include a link 908 at an end thereof, or a link 910 at an end thereof. The link at the end of the feed block support can be connectable to a chain, rope, cable, hook, or other fastening device, by way of a lanyard, knot, S-hook, closeable threaded link, or the like.

FIG. 10 shows an exemplary feed block mold 950 that can be used to mold a hardenable feed block material and that can remain affixed to the feed block, after hardening, for transport, storing, and consumption of the feed block. Feed block mold 950 can comprise a biodegradable material, edible material, combination thereof, or the like, but does not necessarily need to provide any nutritive properties. Feed block mold 950 comprises a side wall 964, a bottom 968, a rim 962, and a top opening 958 defined by an inner edge 954 of rim 962. Feed block mold 950 thus has a hollow interior into which hardenable feed block material can be poured, added, or otherwise disposed, and into which a feed block support can be suspended. Therefore, the feed block material can be hardened in the mold, around, encasing, and encompassing the feed block support. As can be seen, feed block mold 950 has a tapered shape from top to bottom, and a circular cross-section from the top to the bottom, which facilitate stacking of empty molds in a manner whereby bottom 968 can be inserted into top opening 958. A plurality of molds 950 can thus be stacked and efficiently transported and stored until use.

FIG. 11 is a perspective top front view of another support suspension arrangement crossbar 970 for manufacturing the suspendable feed block system according to yet another example of the present teachings. Crossbar 970 includes a notch 972 along its length, at the middle of its length, to maintain a feed block support centrally suspended in feed block material in a mold, during hardening of the material. Crossbar 970 has opposite ends 974 and 976 that can nestle within notches 952 and 956, respectively, of mold 964 shown in FIG. 10. Ends 974 and 976 can be of such diameter, dimension, shape, or combination thereof, relative to notches 952 and 956, to provide a snug, friction fit within the notches and prevent movement or displacement of crossbar 970 during use and during hardening of feed block material in mold 964. Crossbar 970 can be configured to snap in place in notches formed in the mold. Pins, nails, tacks, glue, or other fastening features can be used in addition, or alternatively, to maintain the crossbar in place during molding and hardening.

As indicated above, the suspendable feed block system of the present invention includes a feed block which contains a source of magnesium and/or other nutrients or medicines for animals. In a preferred embodiment, the feed supplement material comprises a source of magnesium in bioavailable form and edible amounts accessible to animals from the feed block in an effective amount to calm the behavior of an animal consuming such amounts compared to the animal without consuming the feed supplement material.

In one or more embodiments, the formulation of the mass of feed supplement material used in the feed block can have a composition comprising molasses or other sugar solution, calcium salt, magnesium oxide, distillers grains, a mold inhibitor, and flavoring, for example, herbs, chamomile, or a flavored nutritive mix.

The molasses can be a molasses-like liquid selected from the group consisting of cane molasses, beet molasses, condensed separator by-products (CSB), separator molasses solubles (SMS), soy molasses, lactose whey or a liquid source of mono-, di- or polysaccharides and mixtures thereof. Molasses derived as a byproduct from the crystallization of cane or beet sugar, for instance, comprises mainly invert sugar, sucrose, water, salts and other carbohydrates. The cane or beet molasses can have water content of from about 3 to about 30 weight percent (e.g., 5-25 wt %), such as for undehydrated raw liquid. The molasses, such as cane or beet molasses, can be used as the raw liquid in the feed block formulation. The molasses and a feed block formulation of the present invention that incorporates the molasses are flowable and pourable until hardened.

The calcium salt can be limestone ($CaCO_3$), calcium chloride, or other edible sources of calcium. The limestone can be D-grade limestone or other types.

The mold inhibitor can be used in amounts of up to 2% by weight, for example from 0.1% by weight to 0.5% by weight, from 0.15% by weight to 0.35% by weight, or in an amount of 0.2% by weight. Calcium propionate is exemplary of edible mold inhibitors that can be used.

The magnesium source can be magnesium oxide (MgO), magnesium sulfate, magnesium stearate, magnesium chloride, or other edible magnesium compounds. The magnesium source preferably is a reactive magnesium oxide (e.g., R—MgO), e.g., highly reactive magnesium oxide (HR—MgO). These magnesium sources are bioavailable and edible to animals. R—MgO of HR—MgO can be essentially amorphous magnesia with low lattice energy, made at low temperatures (e.g., about 600-750° C.) and finely ground, including highly reactive versions, e.g., light-burn of caustic-calcined MgO made from calcining magnesite ($MgCO_3$). R—MgO and HR—MgO can be obtained from TecEco Pty Ltd., Australia), or other suppliers. Generally, the lower the temperature of calcination and finer the grind, the more reactive the magnesium oxide and the faster it hydrates. Reactive magnesium oxide which can be used is described, e.g., in U.S. Patent Appln. Publication No. 2014-0272002 A1 (Fu et al.) and U.S. Pat. No. 7,347,896 (Harrison). The magnesium oxide (MgO, R—MgO, HR—MgO) preferably is in finely divided form, such as, e.g., at least 95 weight percent capable of passing a 100 mesh screen (149 micron), or preferably at least 85 weight percent capable of passing a 325 mesh screen (44 micron).

In place of or in addition to magnesium oxide and a calcium salt, a composition can be added to the molasses or a mixture of molasses and other ingredients to harden the resultant feed block. The composition that can be added can comprise at least one of CaO, reactive MgO, ZnO, MnO, FeO, CuO, $CuO_2$, or combinations thereof, with the composition comprising 0.1% to 10% by weight of the resulting mixture. The resulting mixture can then be mixed to form a homogenous mixture. Such hardening compositions can include those disclosed in U.S. Patent Application Publication No. US 2014/0272002 A1 that is incorporated herein in its entirety by reference. The following oxides can be used instead of or in addition to CaO and reactive magnesium oxide (R—MgO): ZnO (Zinc Oxide), MnO (Manganese Oxide), FeO (Ferrous Oxide), CuO (Cupric Oxide), $CuO_2$ (Cuprous Oxide). These various alternatives to CaO and MgO can be applied at rates of 0.1 to 10% by weight, based on the total weight of the feed block, at least for those feeding situations where the extreme ends of these ranges do not, for the particular animals that consume the block and the particular agent, pose nutritional issues. For example, sheep are generally considered sensitive to excess copper levels, although it is also viewed as an essential key trace nutrient.

The distillers grains can be distillers dried grains with solubles (DDGS), distillers dried grains (DDG), wet distillers grains (WDG), or any combinations thereof. Distiller grains are co-products of ethanol production, such as drymill corn ethanol production. Distillers grains can provide a high quality feedstuff ration for dairy cattle, beef cattle, swine, and other animals. The distillers grain component can be an economical partial replacement for corn, soybean meal, and dicalcium phosphate in livestock and other animal feeds.

Some feed supplements are unpalatable to the intended animals, who will tend to avoid consuming them when presented directly or insufficiently masked with other feed elements. The flavored nutritive mix can be included in the feed block formulation to eliminate or lessen this potential problem. The flavored nutritive mix can comprise one or more protein sources, macro-minerals, vitamins, trace minerals, flavorants, and/or other supplements or additives.

The protein sources can be plant protein products, animal protein products, or combinations thereof. Exemplary of plant protein products are algae meal, beans, canola meal, coconut meal, cottonseed flakes, cottonseed cake, cottonseed meal, low gossypol cottonseed meal, whole pressed cottonseed, guar meal, linseed meal, peanut meal, peas, rapeseed meal, safflower meal, soy protein concentrate, soybean feed, ground soybeans, soybean meal, kibbled soybean meal, heat processed soybeans, soy flour, soy grits, sunflower meal, dehulled sunflower meal, active dry yeast, brewers yeast, culture yeast, dried yeast, grain distillers dried yeast, molasses distillers dried yeast, and primary dried yeast. Exemplary of animal protein products are dried animal blood, animal by-product meal, condensed buttermilk, dried buttermilk, casein, dried hydrolyzed casein, cheese rind, crab meal, fish by-product, fish meal, dried milk albumin, dried whole or skim milk, dried milk protein, poultry by-products, poultry by-product meal, poultry hatchery by-product, shrimp meal, condensed skim milk, condensed cultured skimmed milk, fish protein concentrate, hydrolyzed poultry by-product aggregate, meat and bone meal, condensed whey, and condensed whey products.

Vitamins A, D, and E, tocopherols as well as those medicaments in accordance with FDA regulations may be included in the flavored nutritive mix.

The flavorants can be synthetic or natural. The flavorants can be, for example, saccharin sodium, saccharin calcium, maltose, dextrose, anise, vanilla, honey, carob, coconut, butter, maple, orange, herbs, chamomile, and/or other commercial flavorings, or combinations of one or more of the foregoing and other flavorings and flavoring compounds acceptable to and for animals.

The flavored nutritive mix, as an example, can comprise one or more of yeast or yeast products (e.g., active dry yeast, brewers yeast, culture yeast, hydrolyzed yeast, hydrolyzed yeast extract, grain distillers dried yeast), aluminosilicate (e.g., sodium calcium aluminosilicate or zeolite), processed grain by-product (e.g., oat groats, feeding oat meal, corn bran, corn flour, corn germ meal, corn grits, wheat bran, wheat feed flour), grain (e.g., oats, barley, corn, wheat, rice, rye), soy product (e.g., soybean oil, soy protein concentrate, soybean meal, soy flour, soy grits), crop residue or stover (e.g., corn cobs/fractions, stalks, leaves, husks, etc.), artificial sweetener (e.g., saccharin), natural sweetener (e.g., dextrose), other natural flavorant, and/or other artificial flavorant, and/or other ingredients.

In addition, though magnesium is an important nutrient of interest for an embodiment of the present invention, productivity in the form of weight gain, meat or milk quality, lactation and reproduction may be influenced and improved by other supplements in addition to the magnesium source. Other supplements may include salt, minerals, vitamins, micronutrients, medicines and other feed additives or ingredients, including those mentioned above, as well as other grain processing by-products, fats, oils or oil processing byproducts, anthelmintics, insecticides, larvicides, insect growth regulators, essential oils, synthetic feed ingredients, amino acids, and nutraceuticals.

The mass of feed supplement material used as the feed block formulation can comprise, in one embodiment, 35-85 wt % molasses, 10-30 wt % limestone, 6-20 wt % (highly) reactive magnesium oxide, 2-15 wt % distillers grains, and 1-8 wt % flavored nutritive mix. In another embodiment, the feed block formulation can comprise 55-75 wt % molasses, 12-25 wt % limestone, 10-16 wt % (highly) reactive magnesium oxide, 3-12 wt % distillers grains, and 1-3 wt % flavored nutritive mix.

As an example, feed supplement blocks used in the present invention can be formed with a formulation and/or can have product compositions, such as set forth in the following Tables 1-4:

TABLE 1

| Ingredients | wt % |
| --- | --- |
| Molasses | 50-85 |
| HR-MgO | 5-40 |
| Calcium Carbonate | 5-40 |
| Bulk Edible Fiber | 0-25 |
| Mold Inhibitor | 0-0.5 |

TABLE 2

| Ingredients | wt % |
| --- | --- |
| Molasses Cane | 60-65 |
| Limestone | 15-22 |
| HR-MgO | 12-14 |
| DDGS | 4-9 |
| Flavored Nutritive Mix | 1.5-2.5 |
| Mold Inhibitor | 0-0.5 |

TABLE 3

| Ingredients | wt % |
| --- | --- |
| Molasses Cane | 60-70 |
| HR-MgO | 10-18 |
| TBX 2000 | 1-5 |
| Calcium Carbonate | 10-23 |
| Bulk Cottonseed Meal | 1-5 |
| Mold Inhibitor | 0-0.5 |

TABLE 4

| Ingredients | wt % |
| --- | --- |
| Molasses Cane | 65 |
| HR-MgO | 14 |
| TBX 2000 | 2 |
| Calcium Carbonate | 16.3 |
| Bulk Cottonseed Meal | 2.5 |
| Mold Inhibitor | 0.2 |

As an example, a ton (2000 pounds) of hardenable feed block material can be mixed together from 1300 pounds of molasses, 280 pounds of highly reactive magnesium oxide, 40 pounds of TBX 2000 (from Alltech, Inc., Nicholasville, Ky.), 326 pounds of calcium carbonate, 50 pounds of bulk cottonseed meal, and four pounds of calcium propionate mold inhibitor. The mixture can be poured, by 25-pound aliquots, into a feed block mold, and then treated to effect hardening of the material into a feed block. The mold can then be removed, or, if an edible mold is used, the mold can remain on the feed block and can be consumed or peeled-away from the feed block, consumed, or both, for example, by livestock.

In Tables 3 and 4 shown above, TBX-2000 is a flavored herbal mix intended for diets fed to intensively-confined pigs. The ingredients of TBX-2000 are as follows: hydrolyzed yeast, hydrated sodium calcium aluminosilicate, processed grain by-products, oats, soybean oil, corn cob fractions, sodium saccharin, dextrose, and natural and artificial flavors. TBX-2000 has an average moisture content of 7.25%. A typical nutrient analysis of TBX-2000 is shown in Table 5 below:

TABLE 5

| Crude Protein | 22.5 | Sulfur | 1.21 |
| --- | --- | --- | --- |
| Crude Fat | 1.95 | Phosphorus | 0.65 |

TABLE 5-continued

| Acid Detergent Fiber | 17.9 | Potassium | 0.80 |
|---|---|---|---|
| Ash | 24.5 | Magnesium | 0.47 |
| Total Digestible Nutrients (%) | 60.5 | Calcium | 3.30 |
| Net Energy-Lactation (Mcal/lb) | 0.62 | Sodium | 0.11 |
| Net Energy-Mainten (Mcal/lb) | 0.61 | Iron (ppm) | 943 |
| Net Energy-Gain (Mcal/lb) | 0.33 | Manganese (ppm) | 132 |
| Digestible Energy (Mcal/lb) | 1.21 | Copper (ppm) | 44 |
| Metabol Energy-(Mcal/lb) | 1.02 | Zinc (ppm) | 330 |

The TBX-2000 is an exemplary flavored nutritive mix that can be used to provide nutrients to the animals feeding on the feed block. Other flavored nutritive mixes can be used. Flavored or unflavored multi-mineral mixes can instead or additionally be used, flavored or unflavored multi-vitamin mixes can instead or additionally be used, flavored or unflavored probiotic mixes can instead or additionally be used, flavored or unflavored yeast supplement mixes can instead or additionally be used, combinations thereof can be used, or the like.

The ingredients can be mixed, for example, on a per ton basis. The mixtures exemplified in Tables 1-4 shown above, can be used. The molasses can be heated to a temperature in the range of from about 120° F. to about 140° F. before being mixed with the reactive magnesium oxide and other ingredients. As an example, the molasses can be heated to a temperature in the range of from 124° F. to 130° F., or 127° F., before being mixed with the reactive magnesium oxide and other ingredients. The ingredients are then mixed together into a homogeneous mixture. The mixing time can be long enough to enable the mixture to become homogeneous but not so long that the mixture begins to harden or cure. Once the mixture is homogeneous it can be poured into a feed block mold, such as a biodegradable and/or edible container as described herein. Then the mold, with the feed block material loaded therein, can be immediately moved into an oven that is heated to a temperature of from about 120° F. to about 150° F., for example, 125° F., for an hour or more, or overnight. For example, the container can be maintained in the oven at such an elevated temperature for at least 4 hours or for long enough to enable the magnesium oxide to react and the block to harden. Heat-treatment temperatures and times can be decreased, increased, or otherwise adjusted to enable achieving a desired hardness level without causing the feed block to be too brittle.

One unit, that is, one 25-pound feed block, can serve a pen of 15-25 pigs. A typical rate of consumption that can be controlled would be about 0.92 pounds of feed black, per pig, consumed over a 7-day to 14-day period.

The feed supplement block of the suspendable feed block system of the of the present invention can be prepared by admixing together the liquid ingredients and, if used, any fat ingredients, and thereafter adding the dry ingredients individually or as a dry blended premix, and stirring the mixture to disperse the dry ingredients. Other orders of addition and mixing of the feed block ingredients may be used. As indicated, prior to its solidification, the unhardened flowable feed supplement material can be poured into a container, such as a cardboard box, and the supplement solidifies into a solid block around the indicated support, for example, a support with protuberances, and the resultant product is a very hard, dense block with an embedded support. As the product cools, the sugars in the molasses solidify to form a consistently hard block that cannot easily and rapidly bitten, chewed, or over-consumed by animals. The blocks can be largely impervious to weather elements.

The suspendable feed block system optionally can be combined with other accessories in the same packaging for provision together to distributors and end-users (e.g., farms, ranches, zoos, and the like). For instance, chain fasteners and a separate mounting chain can be included with the suspendable feed block system, as a kit. Alternatively, the suspendable feed block system can supplied as a stand-alone product, and the end-users can provide the indicated accessories used in mounting the system on site.

With regard to feeding directions, the suspendable feed block systems can be deployed on a gate, fence, post, ceiling joist, and so forth, in a place where the animals are confined or where they congregate where larger enclosures are involved. The number of blocks deployed can depend on the type of animals, and an adequate distance between multiple deployed blocks can be provided, in necessary, to prevent crowding.

Based on experimental observations for swine, for example, swine have been observed to consume about 15 to about 25 average grams per day per pig of feed blocks which have the formulation indicated in Table 1, which are suspended above ground from a pen gate using a suspension arrangement such as shown in FIG. 4.

Applicant specifically incorporates the entire contents of all cited references in this disclosure. Further, when an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the invention be limited to the specific values recited when defining a range.

Other embodiments of the present invention will be apparent to those skilled in the art from consideration of the present specification and practice of the present invention disclosed herein. It is intended that the present specification and examples be considered as exemplary only with a true scope and spirit of the invention being indicated by the following claims and equivalents thereof

What is claimed is:

1. A suspendable feed block system for mammals, comprising:
   a) a homogenous feed block comprising a hardened mass of feed supplement material in block form, wherein the feed supplement material comprises a source of magnesium;
   b) a feed block support around which the feed block is formed and hardened, wherein the feed block has been molded in a container that has an edible mold with no corners along an inner sidewall, and the feed block has external sides which are complementary in geometry to the inner sidewall and also have no corners,
      wherein the support comprises an elongated flexible element having a plurality of links, protuberances, or both, located intermittently along a length thereof,
      wherein at least one end of the elongated flexible element protrudes from the feed block and is fastenable to a separate suspending component, and
   c) a chain connector that is manually disconnectible, tamper-proof to mammals, and connected to at least one end of the elongated flexible element in a releasable manner, wherein the chain connector allows the feed block with no corners to freely suspend and rotate so that consumption by the mammals is equal across the block such that it prevents the feed block from being detached from the chain connector by the mammals.

2. The system of claim 1, further comprising d) a biodegradable mold in which the feed block is molded.

3. The system of claim 2, wherein the biodegradable mold comprises a circular cross-section and tapers from one end to an opposite end.

4. The system of claim 2, wherein the biodegradable and edible mold is made of material selected from the group consisting of wood pulp, construction paper, compressed saw dust, cot-tonseed meal, pyrite, rice paper, natural glue, fruit peel, orange peel, wheat, straw, recycled paper, other plant-based.

5. The system of claim 4, wherein the biodegradable and edible mold is made of recycled paper.

6. The system of claim 1, wherein the elongated flexible element comprises an element selected from the group consisting of a chain, a cable, and a rope.

7. The system of claim 1, wherein the feed block has been molded in a container that has a cylindrical, rounded, circular, oval, or other curved geometrical cross-section.

8. The system of claim 1, wherein the feed block has 3 to 12 external sides.

9. The system of claim 1, wherein the feed block has been molded in a container that comprises a cardboard construction.

10. The system of claim 1, further comprising a chain connected to the at least one end of the elongated flexible element via the chain connector, wherein the chain is mountable to a fence or post for suspending the system above ground.

11. The system of claim 1, wherein the feed block has a mass of from about 10 pounds to about 50 pounds (from about 4.5 kg to about 23 kg).

12. The system of claim 1, wherein the feed supplement material comprises the source of magnesium in bioavailable form and edible amounts accessible to mammals from the feed block in an effective amount to calm the behavior of a mammal consuming such amounts compared to the mammal without consuming the feed supplement material.

13. The system of claim 1, wherein the mass of feed supplement material has a composition comprising:
1) molasses;
2) calcium salt;
3) magnesium oxide;
4) distillers grains;
5) mold inhibitor; and
flavored nutritive mix.

14. The system of claim 1, wherein the mass of feed supplement material comprises 35-85 wt % molasses, 10-30 wt % limestone, 6-20 wt % reactive magnesium oxide, 2-15 wt % distillers grains (DDGS, DDG, and/or WDG), 0.01 wt % to 0.5 wt % mold inhibitor, and 1-8 wt % flavored nutritive mix, wherein the flavored nutritive mix comprises one or more of yeast or yeast products, aluminosilicate, processed grain by-product, grain, soy product, crop residue or stover, artificial sweetener, natural sweetener, other natural flavorant, and/or other artificial flavorant.

15. A method of making a suspendable feed block system for mammals, comprising:

(a) loading a solidifiable moldable mass comprising feed supplement ingredients in a container, wherein the feed supplement ingredients comprise a source of magnesium;

(b) suspending a support in the solidifiable moldable mass, wherein the support comprises an elongated flexible element having a plurality of links, protuberances, or both, located intermittently along a length of the element, (c) connecting in a releasable manner the elongated flexible element to a chain connector that is manually disconnectible from the elongated flexible element;

(d) hardening the solidifiable moldable mass after the suspending of step (b) to provide a suspendable, homogenous, and rigid block having a block shape defined by the container, wherein the feed block has been molded in a container that has an edible mold with no corners along an inner sidewall, and the feed block has external sides that are complementary in geometry to the inner sidewall and also have no corners, and wherein at least one end of the elongated flexible element protrudes from the rigid block and is fastenable to a separate suspending component via the chain connector that is tamper-proof to mammals by enabling the feed block with no corners to freely suspend and rotate so that consumption by the mammals is equal across the block such that it prevents the feed block from being detached from the chain connector by the mammals.

16. The method of claim 15, further comprising: (d) removing the suspendable rigid block from the container.

17. The method of claim 15, wherein the suspending in step (b) comprises i) immersing the elongated flexible element into the solidifiable moldable mass or ii) pouring the solidifiable moldable mass around the elongated flexible element as pre-suspended within the container when empty.

18. The method of claim 15, further comprising, before step (a), formulating the solidifiable moldablemass with a composition comprising molasses, calcium salt, magnesium oxide, distillers grains, mold inhibitor, and flavored nutritive mix.

19. The method of claim 15, further comprising, before step (a), formulating the solidifiable moldablemass with a composition comprising 35-85 wt % molasses, 10-30 wt % limestone, 6-20 wt % reactive magnesium oxide, 2-15 wt % distillers grains, 0.01 wt % to 0.5 wt % mold inhibitor, and 1-8 wt % flavored nutritive mix, wherein the flavored nutritive mix comprises one or more of yeast or yeast products, aluminosilicate, processed grain by-product, grain, soy product, crop residue or stover, artificial sweetener, natural sweetener, other natural flavorant, and/or other artificial flavorant.

20. The system of claim 1, wherein the magnesium obtained from the suspended feed block can reduce or prevent tail-biting, aid in the prevention of grass tetany, or provide other health and behavior benefits to the mammals.

21. The method of claim 15, wherein the magnesium obtained from the suspended feed block can reduce or prevent tail-biting, aid in the prevention of grass tetany, or provide other health and behavior benefits to the mammals.

\* \* \* \* \*